United States Patent
Koyama et al.

(10) Patent No.: US 7,626,674 B2
(45) Date of Patent: Dec. 1, 2009

(54) DISPLAY DEVICE HAVING PARTICULAR PARALLAX BARRIER

(75) Inventors: Yoshihide Koyama, Matsusaka (JP); Hiroshi Fukushima, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 159 days.

(21) Appl. No.: 11/994,873

(22) PCT Filed: Jun. 27, 2006

(86) PCT No.: PCT/JP2006/312789
§ 371 (c)(1),
(2), (4) Date: Jan. 7, 2008

(87) PCT Pub. No.: WO2007/007543
PCT Pub. Date: Jan. 18, 2007

(65) Prior Publication Data
US 2009/0086150 A1    Apr. 2, 2009

(30) Foreign Application Priority Data
Jul. 11, 2005    (JP) .............................. 2005-202286

(51) Int. Cl.
*G02F 1/1339* (2006.01)
*G02F 1/1335* (2006.01)
*G02F 1/1333* (2006.01)

(52) U.S. Cl. .................. 349/153; 349/15; 349/190; 349/110

(58) Field of Classification Search .............. 349/153, 349/190, 15, 110
See application file for complete search history.

(56) References Cited

U.S. PATENT DOCUMENTS

| 7,365,809 B2 * | 4/2008 | Tanaka et al. ............... 349/15 |
| 2005/0243253 A1 * | 11/2005 | Imai et al. .................. 349/122 |
| 2005/0285997 A1 | 12/2005 | Koyama et al. |
| 2006/0098281 A1 | 5/2006 | Fukushima et al. |
| 2006/0164578 A1 * | 7/2006 | Matsumoto et al. ......... 349/117 |

FOREIGN PATENT DOCUMENTS

| GB | 2 405 542 A | 3/2005 |
| JP | 04-116619 A | 4/1992 |

(Continued)

OTHER PUBLICATIONS

Official communication issued in the International Application No. PCT/JP2006/312789; mailed on Aug. 1, 2006.

(Continued)

*Primary Examiner*—Mike Qi
(74) *Attorney, Agent, or Firm*—Keating & Bennett, LLP (57) ABSTRACT

A liquid crystal display device includes a liquid crystal display panel and a parallax barrier with a barrier light-shielding layer patterned on a barrier glass, bonded with an adhesive layer composed of an ultraviolet curing resin, provided with an area without a light-shielding layer on the peripheral portion of the parallax barrier, and a sealing material is arranged between a TFT substrate and a CF substrate with at least a portion thereof overlapping with the area without the light-shielding layer. Thus, peeling on the bonding surfaces between the parallax barrier and the liquid crystal display panel does not easily occur, and the occurrence of display non-uniformity due to strain of the CF substrate is prevented.

12 Claims, 10 Drawing Sheets

FOREIGN PATENT DOCUMENTS

| | | | |
|---|---|---|---|
| JP | 10268232 A | * | 10/1998 |
| JP | 2005-134689 A | | 5/2005 |
| JP | 2005-181410 A | | 7/2005 |
| JP | 2005-266438 A | | 9/2005 |
| JP | 2005-321449 A | | 11/2005 |
| JP | 2006-011038 A | | 1/2006 |
| JP | 2006-011212 A | | 1/2006 |

OTHER PUBLICATIONS

Yoshihide Koyama et al.; "Display Device"; U.S. Appl. No. 11/994,871, filed Jan. 7, 2008.

* cited by examiner

DISPLAY DEVICE HAVING PARTICULAR PARALLAX BARRIER

BACKGROUND OF THE INVENTION

1. Field of the Invention

The present invention relates to a display device including a combination of a parallax barrier and an image generation device for generating displaying images, the display device being capable of displaying different images towards a plurality of display directions, respectively.

2. Description of the Related Art

Figure 6:
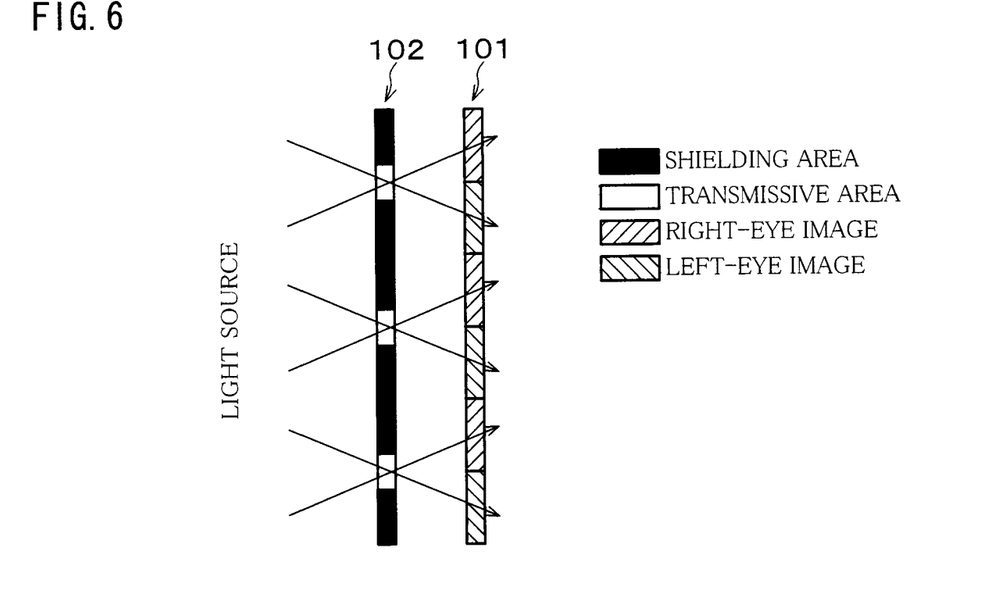
FIG. 6 is a view illustrating an effect of viewing angles in the parallax barrier, in the case of displaying 3D.
Figure 7:
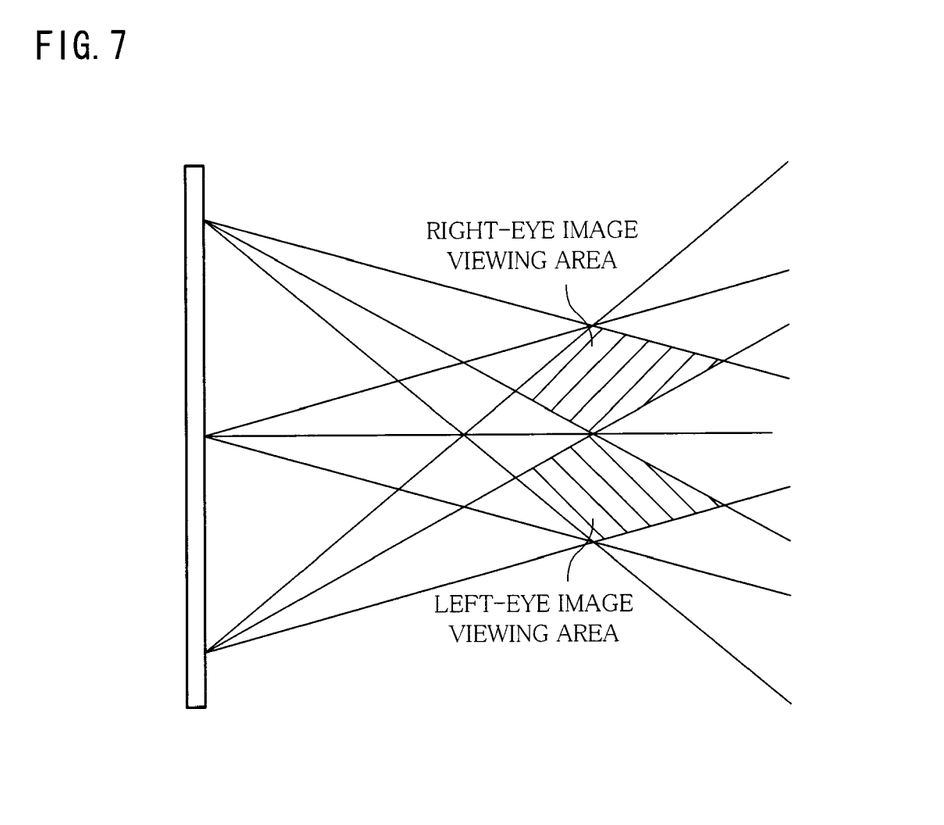
FIG. 7 is a view illustrating a viewing area of a 3D display screen.

Display devices displaying different images towards a plurality of viewpoints have been proposed as 3D display devices in which an image generation device, such as a display panel, and a viewing angle control unit, such as a parallax barrier, are used in combination. With these 3D display devices, as illustrated in FIG. 6, a certain viewing angle is provided by parallax barriers 102 arranged outside image generation device 101. Thus, as illustrated in FIG. 7, if the display device is viewed from a certain viewing area in a space, only the image corresponding to each eye is visually perceived. Accordingly, if the viewer views the 3D display device from a position within the viewing area where the left eye and right eye can visibly perceive only each corresponding image, a 3D image is recognized by the viewer.

Figure 8A:
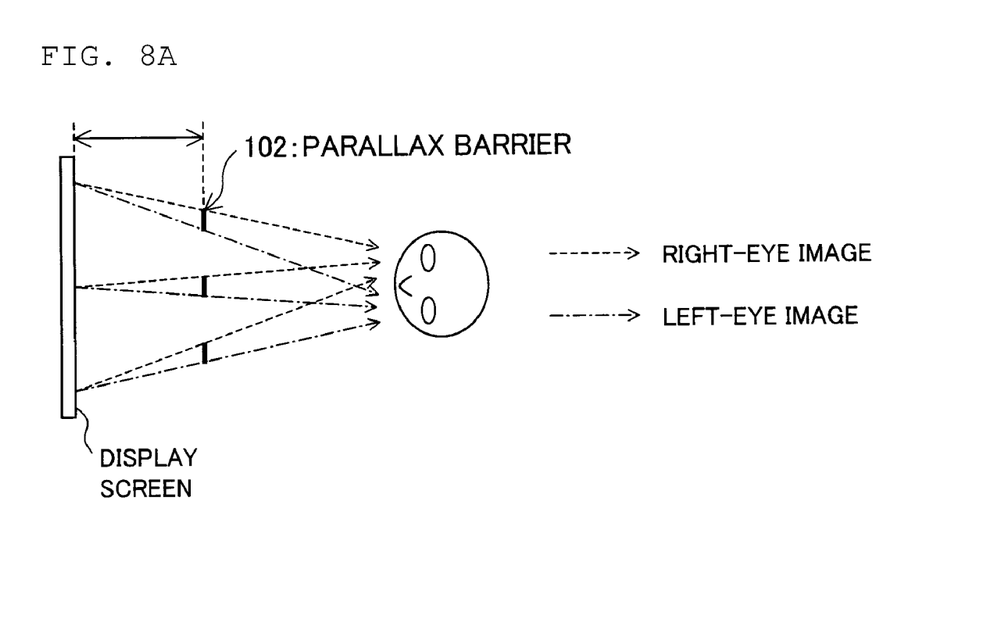
FIG. 8A is a view illustrating the relationship between the display screen and the viewer when displaying 3D.
Figure 8B:
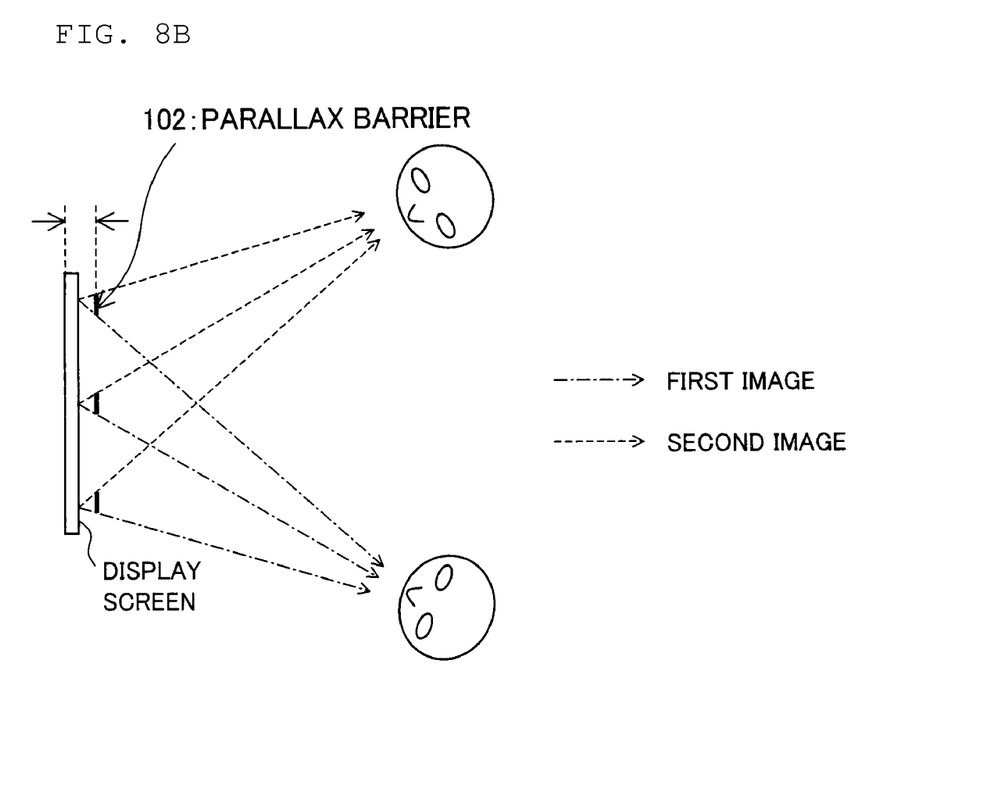
FIG. 8B is a view illustrating the relationship between the display screen and the viewer when doing dual image display.

Also, the use of the display device being able to display different images towards a plurality of viewpoints by combining the image generation device and the viewing angle control unit is not limited to such 3D displays. For example, it is also applicable for use in displays that display different images towards a plurality of viewers (hereafter referred as multiple-screen image display). In other words, with 3D displays, as illustrated in FIG. 8A, the right-eye image and the left-eye image separated according to the viewing angle using parallax barrier 102 positioned away from the display screen, is viewed by the viewer's right-eye and left-eye respectively. On the other hand, with a dual image display, as illustrated in FIG. 8B, a first image and a second image separated according to the viewing angle using parallax barrier 102 positioned close to the display screen are viewed by different viewers respectively.

Figure 9:
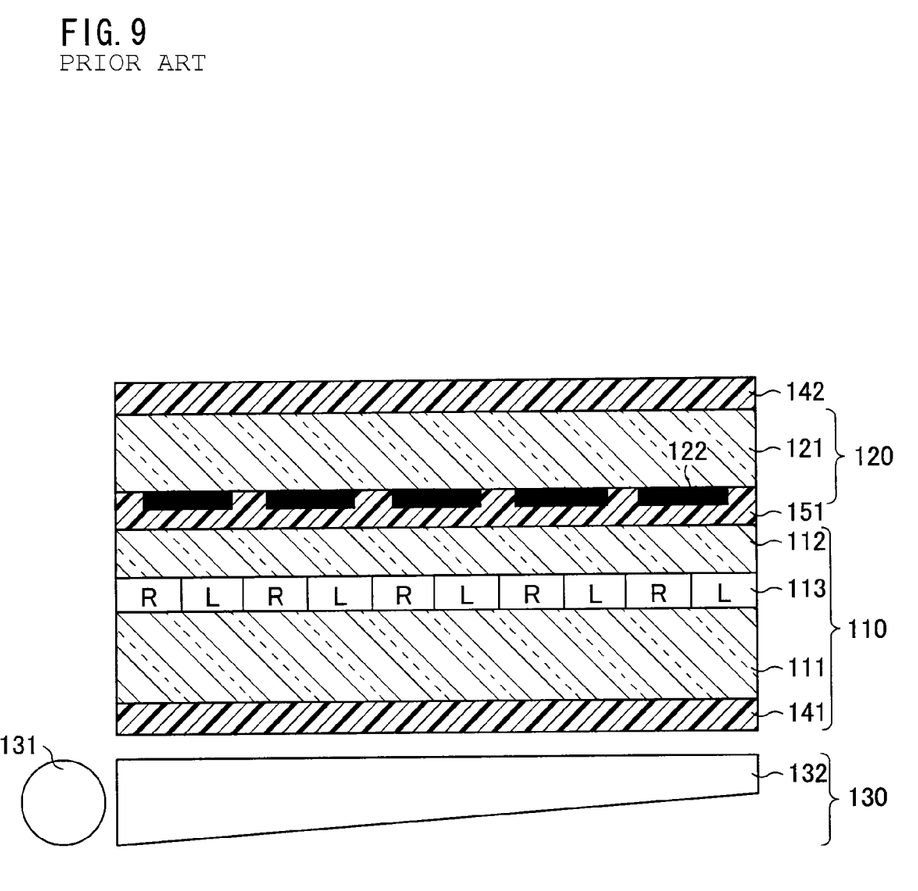
FIG. 9 is a cross sectional view schematically illustrating a structure of the conventional display device.

FIG. 9 is a schematic cross sectional view illustrating an example of a display device in which an image generation device and a viewing angle control unit are combined. The display device illustrated in this figure includes a display panel 110, a parallax barrier 120, a backlight 130, and polarizing plates 141 and 142. FIG. 9 illustrates a structure using a transmissive type liquid crystal display panel as a display panel 110.

The backlight 130, as illustrated in FIG. 9, includes a light source 131 and a reflector section 132 such that light is irradiated towards a display panel 110 by reflecting the light irradiated from a light source 131 with a reflector section 132.

The display panel 110 is an active-matrix type liquid crystal display panel, including a liquid crystal layer 113 sandwiched between two glass substrates 111 and 112 facing each other. Between the glass substrate 111 and 112, a sealing material is positioned to encapsulate the liquid crystal layer 113.

The pixels, as illustrated in FIG. 9, are arranged, with pixel column L for the left-side image display (image display towards the left side of the display device) and pixel column R for the right-side image display (image display towards the right side of the display device) arranged alternately and so as to extend parallel to the extending direction of the data signal lines (not illustrated).

Also, on the surfaces of the glass substrates 111 and 112, which face each other, an alignment film (not illustrated) is provided. The alignment film has been subjected to an alignment process in directions orthogonal to each other. Each alignment film has been rubbed in each direction parallel to the surfaces of the substrates. The polarizing plate 141 is provided on that side of the glass substrate 111, which faces the backlight 130. The polarizing plate 142 is provided on that side of the parallax barrier 120 which is opposite to the displaying side of the parallax barrier 120 (opposite to backlight 130).

The parallax barrier 120 includes a barrier glass 121 and a light-shielding layer 122. The light-shielding layer 122 is illuminated by the backlight 130, and by shielding a portion of the light passed through display panel 110, the light-shielding layer 122 is specific to the display images.

Also, the parallax barrier 120 and display panel 110 are bonded with a resin layer 151 with a certain space therebetween.

However, the conventional structure has a problem in that after the bonding of parallax barrier 120 and display panel 110, peeling of parallax barrier 120 readily occurs. The explanation of the problem is as follows.

Firstly, the parallax barrier 120 is required to be a smaller size than a bonding substrate of the display panel 110 (the glass substrate 112), so that the parallax barrier 120 can be bonded together with the display panel 110 without protruding from an outer edge of the display panel 110 (in order to prevent hooking and cracks).

Figure 10:
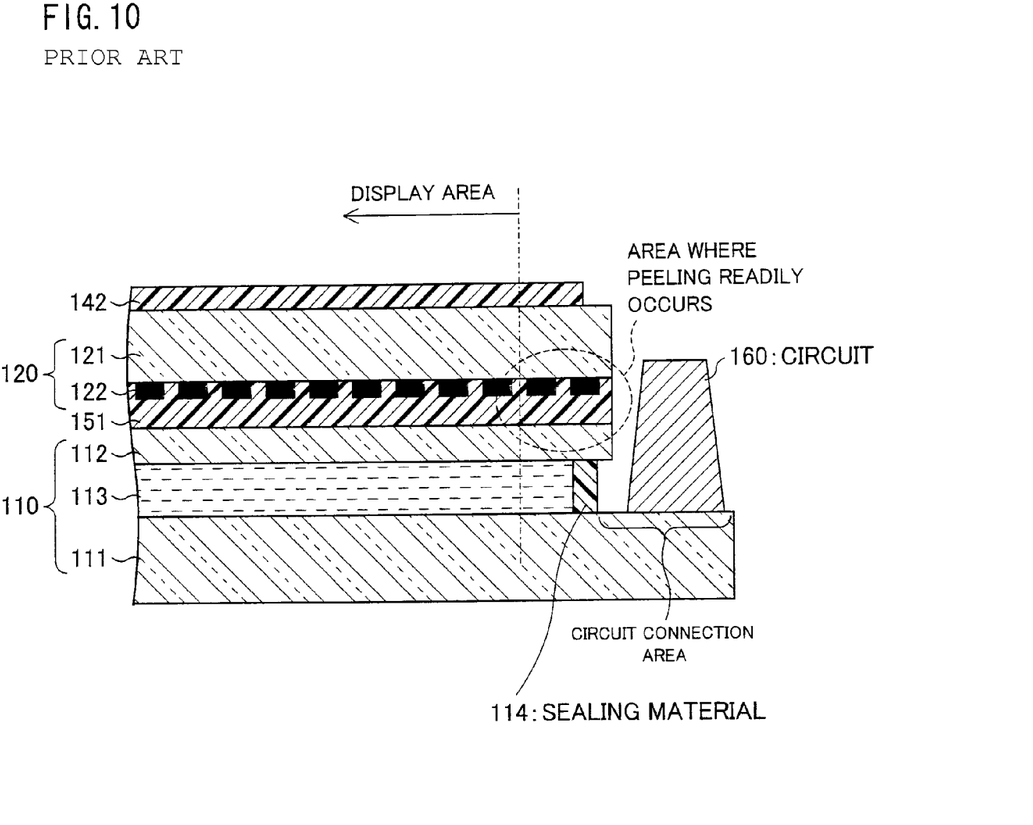
FIG. 10 is a cross sectional view illustrating adhesion of a display panel and a parallax barrier around an edge portion of the conventional display device.

In addition, with recent display devices, in order to downsize, as shown in FIG. 10, a circuit 160, such as a driving circuit for driving a display panel 110, may be formed on the circuit connection area on the surface of the glass substrate 111 composing display panel 110. In addition, with a display device using the parallax barrier 120, usually, the glass substrate 112 that is that one of the substrates which faces toward the parallax barrier 120 is extremely thin.

The thin thickness of the glass substrate 112 is to satisfy a demand to give a thin overall thickness to the display devices having the parallax barrier 120, which tend to have a thick thickness compared to display devices not having the parallax barrier 120.

Since the substrate 112 facing the parallax barrier 120 is bonded with the parallax barrier 120, the thin thickness of the glass substrate 112 itself will not lead to deformation of the liquid crystal layer 113. In addition, there is a trend in the recent technology development to improve the display devices to attain a thinner thickness of glass substrate (see Japan Unexamined Patent Application Publication, Tokukaihei, No. 4-116619 (published Apr. 17, 1992)).

Furthermore, with display devices that display a plurality of different images towards a plurality of viewers, it is required to make the distance between the parallax barrier and the image generation device extremely short (compared to a 3D display) (see Japan Unexamined Patent Application Publication, Tokukai, No. 2005-78094 (published on Mar. 24, 2005)). Therefore, with the display panel 110 using the parallax barrier 120, as shown in FIG. 10, there are display areas with thinner thicknesses than the thickness of the circuit connection area (the total thickness of the glass substrate 111 and the thickness of circuit 160). In this case, the parallax barrier 120 needs to have such a size that the parallax barrier 120 will not contact the circuit 160.

In addition, the barrier pattern in the parallax barrier 120 should be bigger than or around the same size (area) as the display area of the liquid crystal panel 110 (the area where image will be displayed by pixels). Therefore, with the conventional parallax barrier 120, the barrier pattern is fully formed on the parallax barrier 120.

However, in the conventional display device including the parallax barrier 120 and display panel 110 bonded together, as shown in FIG. 10, peeling of parallax barrier 120 at the edge portions of the bonding surface occur. The reasons for this can be surmised as follows.

Firstly, the strength is different between the parallax barrier 120 having only one substrate (the barrier glass 121) and the display panel 110 in which two glass substrates 111 and 112 are bonded together. Furthermore, the parallax barrier 120 and display panel 110 are bonded by using resin layer 151 including an ultraviolet curing resin, and the resin layer 151 is cured by being irradiated by ultraviolet rays from above the parallax barrier 120. At this time, there is a portion of the resin layer 151 where ultraviolet rays inadequately irradiate due to the light-shielding layer 122 in the parallax barrier 120, and in this portion of the resin layer 151 does not cure adequately and a lack of adhesion occurs.

After bonding the parallax barrier 120 and display panel 110, external influences such as heat cause strain due to the differences in coefficient of thermal shrinkage between materials. If this strain is great, peeling occurs in the weakest portion of the bonding surface, in other words the edge portions of the bonding portions.

For example, if the polarizing plate 142 bonded with the parallax barrier 120 shrinks, the barrier substrate 121 is pulled, thereby generating a warp at the edge portion of this barrier substrate 121. At this time, since the display panel 110 including two substrates bonded together has suitable strength, the display panel 110 is unlikely to be warped, but the adhesive layer 151 being the interface between the parallax barrier 120 and display panel 110 peels off.

Consequently, the inventors of the present application developed a display device including a parallax barrier and a display panel wherein the display device has an area where a light-shielding layer is not formed on the peripheral portions of the parallax barrier so that peeling on bonding surfaces of the parallax barrier and display panel will be unlikely to occur (this display device still has not been made public or published as of the filing of present application).

Figure 11:
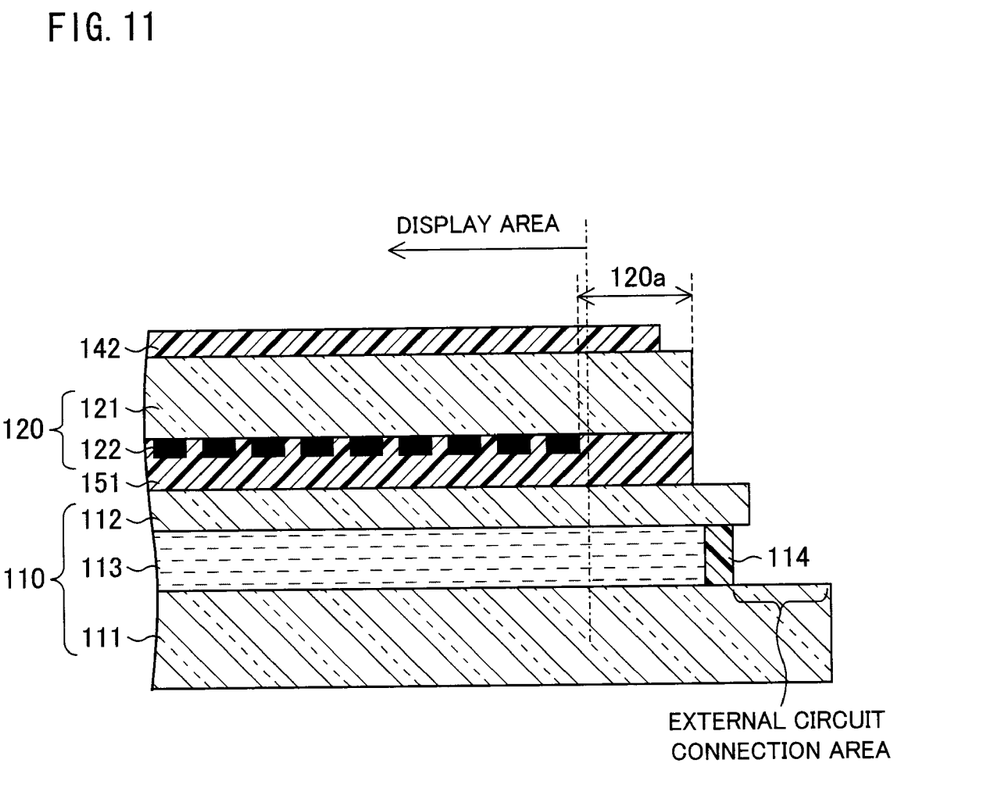
FIG. 11 is a cross sectional view illustrating an example of a structure of a display device in which a sealing material is inadequately positioned, the display device having in the peripheral portion of a parallax barrier an area without a light-shielding layer.

However, the inventors discovered that in a case where the positioning and arrangement of sealing material 114 is not adequate, for example, when sealing material 114 is positioned as shown in FIG. 11, display non-uniformity (light and shade) is generated around the edge area 120a on the parallax barrier 120 in the display device of this configuration. The reasons for this can be surmised as follows.

As explained previously, the parallax barrier 120 and the display panel 110 are bonded together using the resin layer 151 including an ultraviolet curing resin, and ultraviolet ray is irradiated from above the parallax barrier 120. In bonding the parallax barrier 120 and the display panel 110, the adhesion state therebetween are different between the area with the light-shielding layer 122 (parallax barrier) within the display area, and the area without a light-shielding layer 122 (parallax barrier) (edge area 120a) on the peripheral portions of the parallax barrier 120.

In the case where the glass substrate 112 being bonded to the parallax barrier 120 is thick, a difference in adhesion state does not become a problem. However, with the display device using the parallax barrier 120, as explained previously, the glass substrate 112 being bonded to the parallax barrier 120 is extremely thin. Therefore, the difference in the adhesion state puts a strain on the glass substrate 112, and this strain causes non-uniformity in thickness of the liquid crystal layer 113. This non-uniformity in thickness of the liquid crystal layer 113 will be seen by a viewer as non-uniform brightness of the displayed image.

It is deduced that the strain of the glass substrate 112 caused by the difference in adhesion state between the areas with light-shielding layer 122 and areas without light-shielding layer 122 is caused due to the following reasons.

Firstly, in the resin layer 151, there is a difference in coefficient of curing shrinkage between the area with the light-shielding layer 122 and the area without the light-shielding layer 122, since the amount of ultraviolet radiation differs between the area with the light-shielding layer 122 and the area without the light-shielding layer 122. Specifically, the amount of ultraviolet radiation towards the resin layer 151 for areas without the light-shielding layer 122 is greater than the amount of ultraviolet radiation towards an area with the light-shielding layer 122. Therefore, the coefficient of curing shrinkage of the resin layer 151 at the edge portion of the parallax barrier 120 (the portion without the light-shielding layer 122) is greater than the resin layer 151 within the portion with the light-shielding layer 122 in the parallax barrier 120. Thus, it is considered that at the edge portion of the parallax barrier 120 with the greater coefficient of curing shrinkage in the resin 151, the thin glass substrate 112 is restrained from being pulled towards the display panel 110.

In addition, since the amount of ultraviolet radiation towards the resin layer 151 in the area without the light-shielding layer 122 is greater than the amount of ultraviolet radiation towards the resin layer 151 in the area with the light-shielding 122, the adhesion force of the resin layer 151 in the edge portion of the parallax barrier 120 (the portion without the light-shielding 122) is strong. Therefore, it is considered that the glass substrate 112 strained from the stress caused by the thermal shrinkage of members such as the barrier glass 121 and the glass substrate 112 being concentrated towards the edge portions of the parallax barrier 120 having strong adhesion force.

Especially, the problem is significant with multiple-image display devices using thin substrates. With multiple-image display devices, it is required to shorten the distance between the parallax barrier and the image generation surface of the image generation device, and as a substrate on the parallax barrier side of the image generation device, usually a substrate with a thickness of 30 μm to 170 μm, preferably 40 μm to 100 μm is used. For example, if providing rightward and leftward viewing angles to display different images to viewers, it is required to set the distance between the parallax barrier and the image generation surface of the image generation device (for example, the thickness of "adhesive layer 151 and glass substrate 112" in FIG. 9) to 60 μm to 200 μm. This distance is decided considering the thickness of this adhesive layer.

SUMMARY OF THE INVENTION

In order to overcome the problems described above, preferred embodiments of the present invention provide a liquid crystal display device including a parallax barrier and display panel bonded with an ultraviolet curing resin therebetween, wherein peeling between the bonding surfaces of the parallax barrier and the liquid crystal display panel is prevented from occurring, and display non-uniformity due to strains in substrates is prevented.

A display device according to a preferred embodiment of the present invention includes an image generation device arranged to generate display images, and a parallax barrier including a light-shielding layer of a certain pattern disposed on a transparent substrate, the image generating device and the parallax barrier being bonded with an ultraviolet curing resin, wherein the image generation device includes a pair of substrates bonded together by a sealing material; around a peripheral portion of the parallax barrier, the parallax barrier includes an area without the light-shielding layer; the ultraviolet curing resin intervenes at least at the area without the light-shielding layer in the parallax barrier and the image generation device; and the sealing material is arranged between the pair of substrates in such a manner that at least a portion of the sealing material overlaps the area without the light-shielding layer.

According to this unique structure, an ultraviolet curing resin intervenes in least at the area without the light-shielding layer in the parallax barrier and the image generation device, so that if ultraviolet rays are irradiated to the uncured ultraviolet curing resin through the parallax barrier during manufacturing, much of the ultraviolet rays will be irradiated through the area without the light-shielding layer to the ultraviolet curing resin that intervenes in the area without the light-shielding layer and the image generation device. Therefore, in the display device of the present preferred embodiment, the ultraviolet curing resin intervening in the area without the light-shielding layer and the image generation device can strongly bond the area without the light-shielding layer and the image generation device. Accordingly, since this area without a light-shielding layer is arranged in the peripheral area of the parallax barrier, adequate adhesion strength of ultraviolet curing resin in the peripheral areas where peeling of parallax barriers readily occur most often in conventional display devices can be achieved. As a result, the peeling of bonding surfaces of the parallax barrier and the image generation device is reliably prevented.

In addition, in this unique structure, in the case where an ultraviolet curing resin exists in areas other than the area without a light-shielding layer between the parallax barrier and the display panel, if ultraviolet rays are irradiated through the parallax barrier towards the uncured ultraviolet curing resin during manufacturing, a difference in the adhesion state will occur in the bonding of the parallax barrier and the image generation device by the ultraviolet curing resin, between the area without a light-shielding layer transmitting much ultraviolet rays and other areas transmitting only a few ultraviolet rays. In addition, in the structure of the present preferred embodiment, in the case where the ultraviolet curing resin does not exist in areas other than the area without the light-shielding layer between the parallax barrier and the image generation device, the parallax barrier and the image generation device will not be bonded by the ultraviolet curing resin. The stress that is caused from these differences in an adhesion state will possibly generate a strain near the area without a light-shielding layer of the substrate on the side of the parallax barrier composing the image generation device. However, in this structure, the sealing material on the back side of the substrate on the side of the parallax barrier (the back side of the surface that is facing the parallax barrier) can bond and hold the portion of the substrate on the parallax barrier side that overlaps with the area without a light-shielding layer of the parallax barrier, with the other substrates. Accordingly, the substrate on the side of the parallax barrier that composes the image generation device can inhibit any deformation and strain due to the stress. Therefore, this can prevent the occurrence of contrast non-uniformity in the display caused by the strain of substrates on the side of the parallax barrier.

In the display device according to a preferred embodiment of the resent invention, the sealing material is preferably arranged without overlapping with the light-shielding layer of the parallax barrier.

In this structure, it is easy to enlarge the area without the light-shielding layer. By enlarging the area without the light-shielding layer, it adequately secures the adhesion force of the edge portions of the parallax barrier, and can prevent the occurrence of peeling on the bonding surface between the parallax barrier and the image generation device. In addition, in the case where the sealing material is arranged to overlap with the light-shielding layer in the parallax barrier, the area will be smaller in which the sealing material will bond and hold the substrate on the side of the parallax barrier corresponding to the area without the light-shielding layer, so that the effect to inhibit the occurrence of display non-uniformity will decrease.

In the display device according to a preferred embodiment of the present invention, the sealing material is preferably arranged such that a distance between an image of the sealing material projected on the surface of the transparent substrate and the light-shielding layer is about 2 mm or shorter, for example.

With this arrangement, it is possible to further inhibit the strain of substrates on the side of the parallax barrier, thereby surely preventing the occurrence of brightness non-uniformity in display.

In the display device according to a preferred embodiment of the present invention, the whole of the sealing material is preferably overlapping with the parallax barrier.

Thus, the whole sealing material can bond and hold the parallax barrier substrate with the other substrate. Therefore, it effectively prevents the occurrence of display non-uniformity even more.

In the display device according to a preferred embodiment of the present invention, the whole of the parallax barrier is preferably overlapping with the image generation device.

Thus, the parallax barrier does not protrude from the image generation device, and can prevent cracks and peeling of the parallax barrier.

In addition, in the display device according to a preferred embodiment of the present invention, the whole sealing material is preferably overlapping with the parallax barrier without overlapping with the light-shielding layer in the parallax barrier. In other words, the sealing material is preferably overlapping with the area without the light-shielding layer of the parallax barrier. Thus, it is possible to broaden the area of the sealing material bonding and holding the substrate on the side of the parallax barrier corresponding to the area without the light-shielding layer, thereby making it possible to inhibit the occurrence of display non-uniformity even more.

Other features, elements, processes, steps, characteristics and advantages of the present invention will become more apparent from the following detailed description of preferred embodiments of the present invention with reference to the attached drawings.

BRIEF DESCRIPTION OF DRAWINGS

FIG. 1A and FIG. 1B illustrate a preferred embodiment of the present invention, and are cross sectional views illustrating adhesion of a liquid crystal display panel and a parallax barrier around an edge portion of a display device, wherein

DETAILED DESCRIPTION OF PREFERRED EMBODIMENTS

Figure 5:
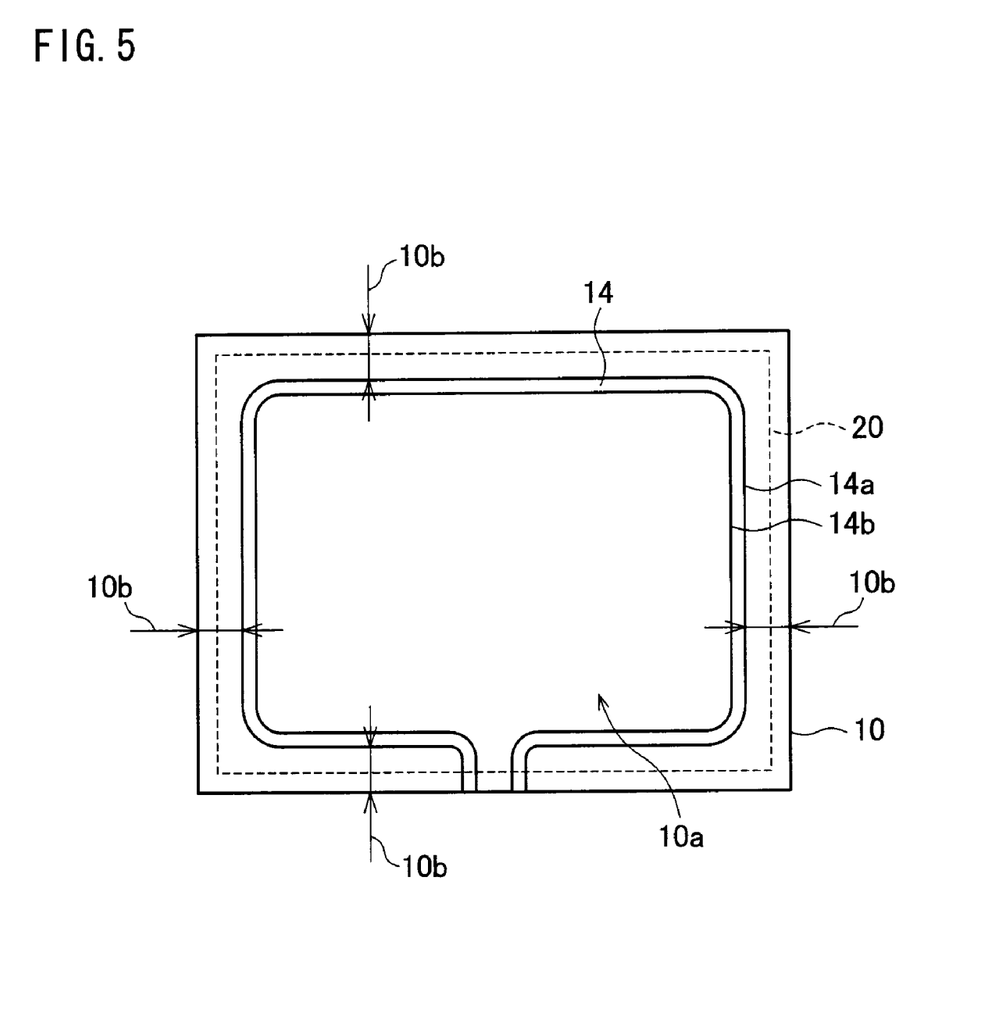
FIG. 5 is a plane view illustrating the relationship between the parallax barrier, the sealing material and the CF substrate of the display device according to a preferred embodiment of the present invention.

The explanations of a preferred embodiment of the present invention based on FIG. 1 or FIG. 5 is as follows. In the following explanation, a multiple-image display device using a liquid crystal display device (so-called dual-view display) is provided as an example as the display device according to the present invention. In addition, the display device according to the present invention is also applicable to 3D display devices.

Figure 2:
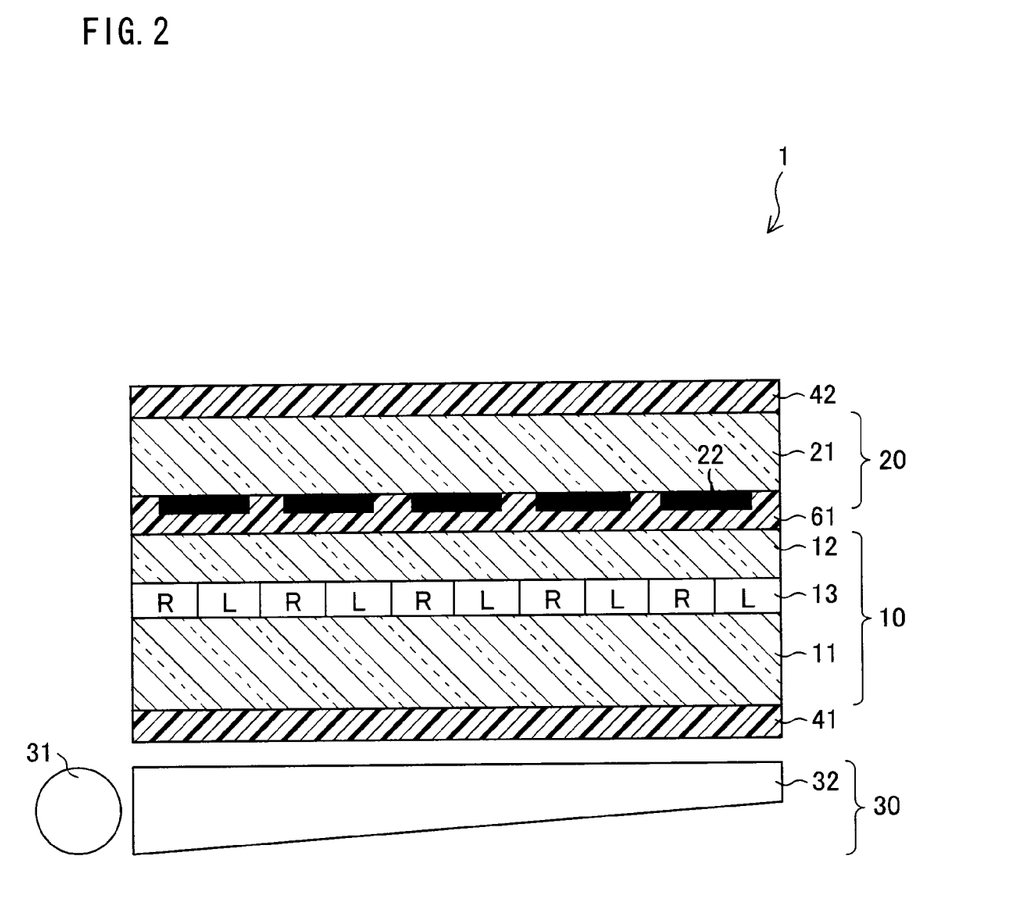
FIG. 2 is a cross sectional view schematically illustrating a structure of the display device.

Firstly, FIG. 2 schematically illustrates a structure of a liquid crystal display device 1 according to the present preferred embodiment. As illustrated in FIG. 2, the liquid crystal display device 1 preferably includes a display panel 10, a parallax barrier 20, a backlight 30, polarizing plates 41 and 42 and an adhesive layer (ultraviolet curing resin layer) 61.

The backlight 30 preferably includes a light source 31 and a reflector section 32, and by reflecting the light from the light source 31 by the reflector section 32, light is irradiated towards the liquid crystal display panel 10. As the light source 31, for example LED (light emitting diode), cold cathode fluorescent tube (CCFT), cold cathode fluorescent lump (CCFL) or the like is used.

The liquid crystal display panel 10 preferably is an active-matrix type liquid crystal display panel, with a liquid crystal layer 13 including nematic liquid crystal sandwiched between a TFT (Thin Film Transistor) substrate (substrate) 11 and a CF (Color Filter) substrate (substrate) 12 arranged facing each other. Between TFT substrate 11 and CF substrate 12, a sealing material 14 is arranged to encapsulate the liquid crystal layer 13 and also to bond the TFT substrate 11 and CF substrate 12. The sealing material 14 is arranged in the peripheral portions between the TFT substrate 11 and CF substrate 12, surrounding the liquid crystal layer 13.

The TFT substrate 11 includes a transparent substrate such as glass substrate or plastic substrate on which a plurality of data signal lines and a plurality of scanning signal lines crossing the data signal lines respectively are arranged, and pixels are provided for each of intersections of the data signal lines and scanning signal lines. The pixels are arranged, with a pixel column L for left-side image display (image display towards the left side of the liquid crystal display device; such as left-eye display with a 3D display device and a passenger seat side display with a dual image display device) and a pixel column R for right-side image display (image display towards the right side of the liquid crystal display device; such as right-eye display with a 3D display device and a driver's seat side display with a dual image display device) arranged alternately and so as to extend parallel to the extending direction of the data signal line. In the pixel column L area (first display area), the display image for the right side is generated, and in the pixel column R area (second display area), the display image for the left side is generated.

With the display device 1, the TFT substrate 11 preferably is about 700 μm in thickness, for example. Also, on that surface of the TFT substrate 11 which faces the backlight 30, a polarizing plate 41 is provided. Also, on each of surfaces of the TFT substrate 11 and CF substrate 12 which face each other, an alignment film is provided (not illustrated). The alignment films have been subjected to alignment process to have alignment directions substantially orthogonal to each other.

Also, the CF substrate 12 includes a transparent substrate such as glass substrate or plastic substrate on which a color filter layer (not illustrated) is provided. The color filter layer preferably provides each R, G and B picture element to each pixel. The CF substrate 12 preferably is thinned to a thickness of about 50 μm by mechanical process, for example, chemical etching process described in Japanese Unexamined Patent Application, Tokukaihei, No. 4-116649 (or polishing).

The parallax barrier 20 preferably includes a barrier glass 21 and a barrier light-shielding layer 22. As the barrier glass 21, transparent glass having a thickness of about 0.7 mm is preferably used, for example. Also, a barrier light-shielding layer 22 is formed on the barrier glass 21. Also, on the display side of the barrier glass 21 (opposite to the side thereof which faces the backlight 30), a polarizing plate 42 is arranged.

The barrier light-shielding layer 22 is preferably provided such that its columns are aligned in parallel with extending directions of the pixel columns R and L, for example, in the form of stripe-shaped columns. However, the pattern shape of the barrier light-shielding layer 22 is not specifically limited, and may be zigzag shape or delta shape other than stripe shape. The material for the barrier light-shielding layer 22 is not specifically limited, for example, it may be formed using a photosensitive resin in which black pigment is dispersed, or be formed patterning a metal thin film. Also, the widths of the columns constructing the barrier light-shielding layer 22 which are dimensions in an orthogonal direction towards the extending direction of pixel columns R and L (barrier width) preferably is about 40 μm, for example. Also, the pitch of each column constructing the barrier light-shielding layer 22 (barrier pitch) is preferably set to about 129.99 μm, for example.

Also, each column of the barrier light-shielding layer 22 is set to correspond with each pixel column of the display panel 10 and provides a different viewing angle to the area of pixel column R and the area of pixel column L. That is to say, each column of the barrier light-shielding layer 22 is set so as to shield a portion of the light exiting each pixel column of the display panel 10 so that it is not viewed from the direction other than the display direction of each pixel.

Figure 3:
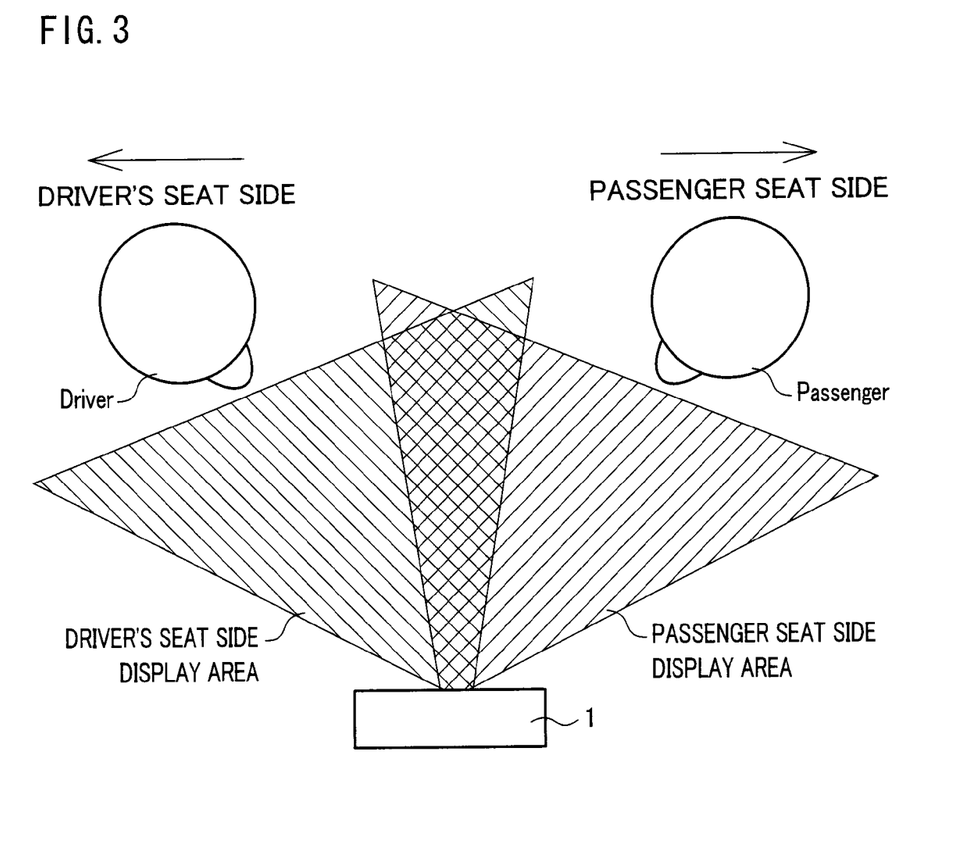
FIG. 3 is an explanation view illustrating how the display device displays different images to the driver's seat side and the passenger seat side, respectively.

Therefore, in the case the liquid crystal display device 1 is used, for example, as a in-car display device, pixel column R for the driver's seat side can be viewed from the driver's seat side but cannot be viewed from the passenger seat side, and pixel column L can be viewed from the passenger seat side but cannot be viewed from the driver's seat side as illustrated in FIG. 3. Thus, with liquid crystal display device 1, it is possible to display different images towards the driver's seat side and the passenger seat side.

An adhesive layer 61 bonds the parallax barrier 20 and display panel 10 together, and is formed on the whole facing surfaces of parallax barrier 20 and display panel 10. In other words, the parallax barrier 20 and display panel 10 are bonded via the whole surfaces.

As the adhesive layer 61, an ultraviolet curing resin is preferably used. The thickness of the adhesive layer 61 (the space between barrier glass 21 and CF substrate 12) is preferably about 30 μm to about 200 μm, for example. With the display device 1, the thickness of the adhesive layer 61 preferably is about 40 μm, for example. In addition, preferably a material that maintains an elasticity of some extent even after curing (for example a "gummy" material) is used as the ultraviolet curing resin composing the adhesive layer 61 to alleviate any shock or stress caused by the strain of the barrier glass 21 and the CF substrate 12 due to heat.

In order to adequately display each image of liquid crystal display device 1 separated to the right side and the left side, it is necessary to accurately align the parallax barrier 20 and display panel 10. Therefore, for example, it is preferable to create an alignment mark for both, and accurately align them referring to the alignment marks.

Figure 1A:
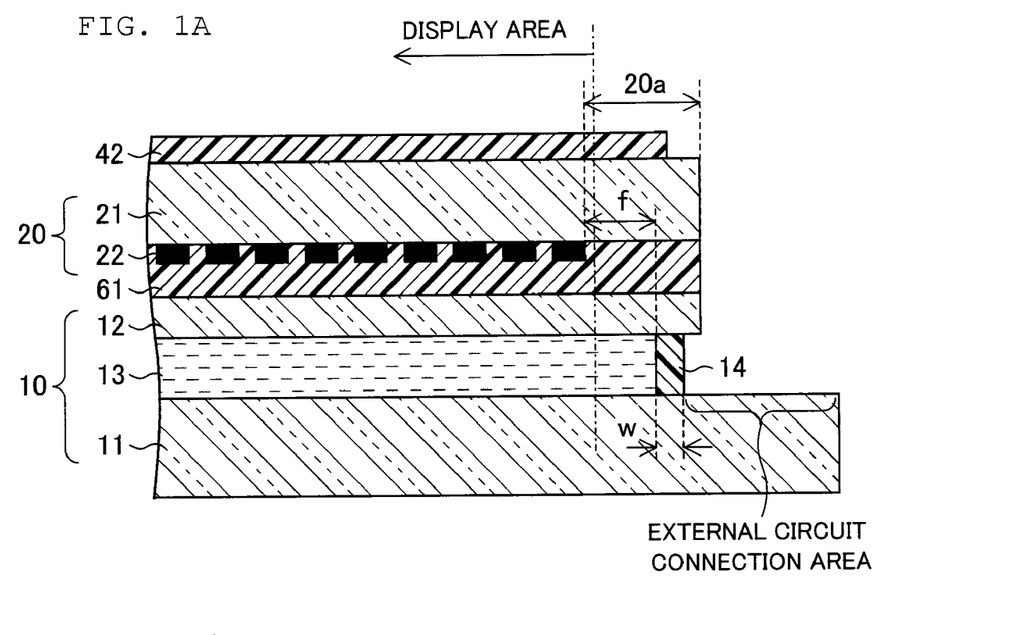
FIG. 1A is a cross sectional view wherein a pattern formation area of a barrier light-shielding layer is formed so that it is almost the same as a display area of a corresponding display panel.
Figure 1B:
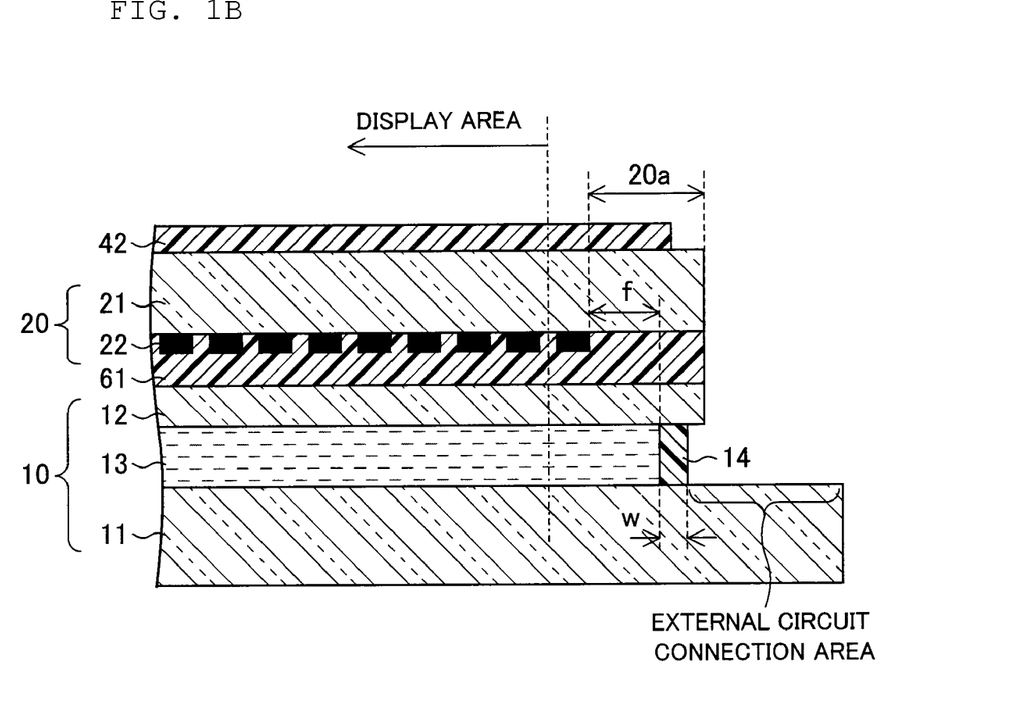
FIG. 1B is a cross sectional view wherein the pattern formation area of the barrier light-shielding layer is formed so that it is larger than the display area of the corresponding display panel.

Here we will explain in detail of the adhesion manner of the parallax barrier 20 and the liquid crystal display panel 10 in the liquid crystal display panel 1, referring to FIG. 1A and FIG. 1B. In other words, the present invention is provided to realize a structure where peeling is unlikely to occur on the bonding surfaces in a liquid crystal display device including a parallax barrier and a liquid crystal display panel. FIG. 1A and FIG. 1B illustrate the edge portions of the bonding surfaces of the parallax barrier 20 and the liquid crystal display panel 10.

Figure 4:
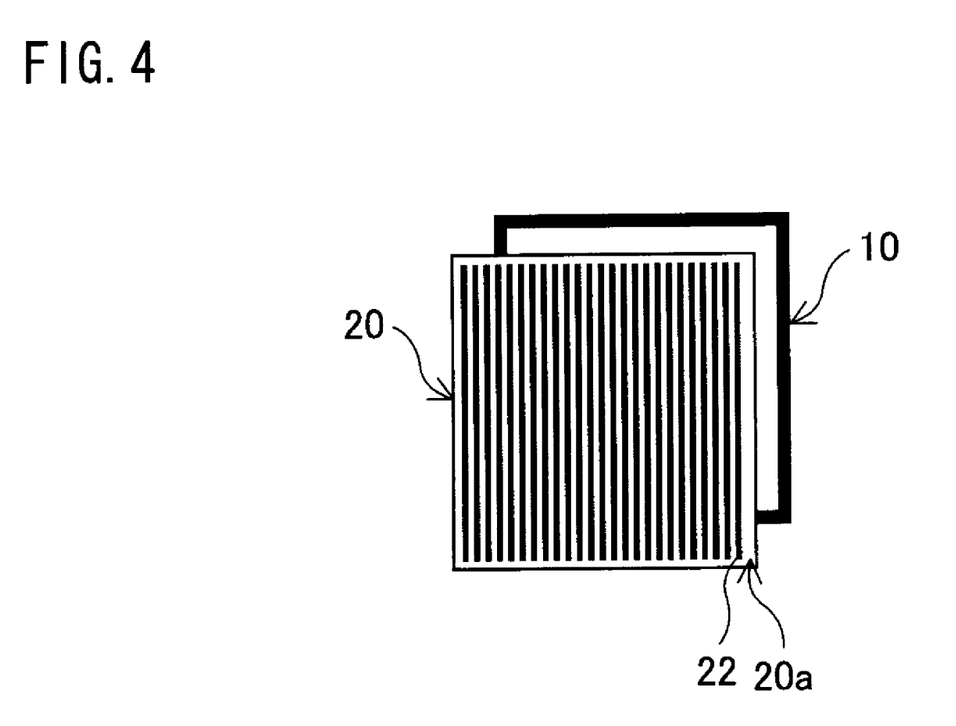
FIG. 4 is a plane view illustrating the relationship between the pattern layout of the parallax barrier and the liquid crystal display panel, according to a preferred embodiment of the present invention.

As shown in FIG. 1A and FIG. 1B, in the parallax barrier 20 according to the present preferred embodiment, the area where the barrier light-shielding layer 22 is formed is preferably only within the display area of the liquid crystal display panel 10. In other words, the parallax barrier 20, as illustrated in FIG. 1A, FIG. 1B and FIG. 4, includes an area without the light-shielding layer 20a in the peripheral portions of the parallax barrier 20.

In the parallax barrier 20, in the area without the light-shielding layer 20a, the bonding process of parallax barrier 20 and display panel 10 will be performed without hindering the adhesive layer 61 including the photo-curing resin from being irradiated with light for curing the adhesive layer 61. Therefore, an adequate adhesion strength can be provided in the area where the barrier light-shielding layer 22 is not formed, in other words, in the peripheral portions where the peeling of parallax barrier occurs most often with the conventional display devices, thereby preventing the peeling on the bonding surface of the parallax barrier and the display panel. The area without the barrier light-shielding layer 20a in the parallax barrier 20 can obtain enough adhesion strength to prevent the peeling on parallax barrier if the width is about 1 mm or more, for example.

In addition, the liquid crystal display panel 10 is preferably produced by the method wherein after bonding the parallax barrier 20 and the liquid crystal display panel 10 with the uncured adhesive layer 61, ultraviolet rays are radiated through the parallax barrier 20 to the cured adhesive layer 61. Therefore, a difference in adhesion state of the parallax barrier 20 and the liquid crystal display panel 10 joined by the adhesive layer 61 occurs, between the area without the light-shielding layer 20a transmitting many ultraviolet rays and other areas that only transmit a few ultraviolet rays. Due to this difference in adhesion state, the CF substrate 12 receives the stress with the parallax barrier 20 around the area without the light-shielding layer 20a, and a strain occurs on the thin CF substrate 12.

In order to prevent deformation of the CF substrate 12 due to this stress, the liquid crystal display device 1 according to the present preferred embodiment is arranged such that as shown in FIG. 1A and FIG. 1B, the area without the barrier light-shielding area 22 at the edge portion of the parallax barrier 20 (area without the light-shielding layer 20a) and the sealing position of the liquid crystal display panel 10 are arranged to overlap. In other words, the sealing material 14 is arranged so that it overlaps with the area without the light-shielding layer 20a of the parallax barrier 20, between the TFT substrate 11 and the CF substrate 12. At this time, the area without the light-shielding layer 20a is arranged such that it does not cover the display area (the area where the image is displayed) on the display panel (liquid crystal display panel 10).

As shown in FIG. 1A, the pattern formation area of the barrier light-shielding layer 22 can be formed such that it is almost the same as the display area of the corresponding liquid crystal display panel 10. However, as shown in FIG. 1B, the formation area of the barrier light-shielding layer 22 is preferably larger than the display area of the corresponding display panel (liquid crystal display panel 10). The barrier light-shielding layer 22 located outside the display area are provided for the following two purposes: (1) being a dummy barrier light-shielding layer, in order to attain uniform thickness of the barrier light-shielding layer 22 (film thickness), attain uniform bonding pitch between the parallax barrier 20 and the display panel (liquid crystal display panel 10), and attain a greater bonding alignment allowance (tolerance for bonding misalignment) between the parallax barrier 20 and the display panel (liquid crystal display panel 10); (2) there are cases where arrangement of a barrier light-shielding layer outside the display area is necessary depending on the arrangement pattern of the pixel column R and L, and is provided in this case.

Thus, the stress the thin CF substrate 12 (caused by the difference in adhesion state between the area without the light-shielding layer 20a and the other areas in the parallax barrier 20) can be alleviated by the sealing material 14. In other words, the sealing material 14 having the required strength can bond and hold the portion of the CF substrate 12 that is overlapping with the area without the light-shielding layer 20a in the parallax barrier 21 (the portion of the CF substrate that is stressed due to the difference in adhesion strength), with the TFT substrate 11. Therefore, it is possible to inhibit the strain and deformation in the CF substrate 12 due to the stress. Thereby, it is possible to prevent the occurrence of brightness non-uniformity in display caused by the strain of the CF substrate 12.

The sealing material 14 is preferably arranged so that the distance f (width of space) from the image of the sealing material 14 projected on the surface of the barrier glass 21 (the surface that faces the liquid crystal display panel 10) to the barrier light-shielding layer 22 is about 2 mm or shorter, for example. By making the distance f about 2 mm or shorter, the strain of the CF substrate can be further inhibited, and can steadily prevent the occurrence of brightness non-uniformity in display. If the distance f exceeds about 2 mm, the strain in the CF substrate 12 becomes significant, and brightness non-uniformity in display may occur.

In addition, the sealing material 14 is preferably arranged such that the distance f is 0 mm or longer. In other words, the sealing material 14 is preferably arranged such that it does not overlap with the barrier light-shielding layer 22 in the parallax barrier 21. In the case where a portion of the sealing material 14 is overlapping with the barrier light-shielding layer 22, in other words, the barrier light-shielding layer 22 is overlapping with the sealing material 14, the area of the sealing material 14 which bonds and holds the portion in the CF substrate 12 corresponding to the area without the light-shielding layer 20a becomes small, and the effect to inhibit the occurrence of display non-uniformity decreases. In addition, if the barrier light-shielding layer 22 is overlapping with the sealing material 14, the size of the area without the light-shielding layer 20a tends to become smaller in size. If the size of the area without the light-shielding layer 20a is small, the adhesion force of the edge portion of the parallax barrier 20 becomes insufficient, and peeling on the bonding surfaces of the parallax barrier 20 and the liquid crystal display panel 10 may occur.

From these points, the distance f is preferably in the range of about 0 mm to about 2 mm, and it is further preferable over about 0 mm but not more than about 2 mm. Considering there is some bonding alignment allowance (allowable misalignment of the parallax barrier 20 and the CF substrate 12), it is most preferred to make this approximately 1 mm, for example.

The sealing material 14 is preferably arranged so that the whole of the sealing material overlaps with the parallax barrier 21. In other words, the size of the parallax barrier 21 is preferred to be larger than the size of the area surrounded by a circumference 14a of the sealing material 14 (refer to FIG. 5) in the liquid crystal display panel 10. Thus, it is possible to bond and hold the CF substrate 12 and the TFT substrate 11 with the whole of sealing material 14 which has strength. Therefore, the occurrence of display non-uniformity can effectively be prevented further. In the case where a portion of the sealing material 14 is not overlapping the parallax barrier 21, the area to bond and hold the CF substrate 12 on the sealing material 14 is small, and the effect to inhibit the occurrence of display non-uniformity will decrease.

The parallax barrier 20 is preferably arranged such that the whole overlaps with the liquid crystal display panel 10. In other words, the size of the liquid crystal display panel 10 preferably is not smaller than the size of the parallax barrier 20. As a result, the parallax barrier 20 will not protrude from the liquid crystal display panel 10, and can inhibit any cracks or peeling of the parallax barrier 20. In the case where the size of the liquid crystal display panel 10 is smaller than the size of the parallax barrier 20, the parallax barrier 20 will protrude from the liquid crystal display panel 10, so that cracks or peeling on the parallax barrier 20 may occur.

Thus, the sealing material 14 is most preferably arranged such that the whole of sealing material 14 is overlapping with the parallax barrier 21, and that the whole parallax barrier 20 is preferably arranged to overlap with the liquid crystal display panel 10. In other words, as illustrated in FIG. 5, it is most preferred to have the circumference of the parallax barrier 21 be within area 10b surrounded by the circumference 14a of the sealing material 14 and the circumference of the liquid crystal display panel 10.

In addition, the sealing material 14 is preferably arranged such that the whole of sealing material 14 is overlapping with the parallax barrier 21 without overlapping with the barrier light-shielding layer 22 in the parallax barrier 21. In other words, the whole of the sealing material 14 is preferably arranged to overlap with the area without the light-shielding layer 20a of the parallax barrier 20 (so that the whole of the sealing material 14 does not overlap with the barrier light-shielding layer 22). Thus, the area of the sealing material 14 bonding and holding the portion of CF substrate 12 corresponding to the area without a light-shielding layer 20a may be enlarged, and can further inhibit the occurrence of display non-uniformity.

The width W of the sealing material 14 is most preferably approximately 1 mm, for example.

The sealing material 14 includes, for example, resins such as one-component modified epoxy resin (for example, "LC STRUCTBOND" (registered trademark)).

The display device of the present invention is not limited to liquid crystal display devices as in the explanation above. As an image generation device combined with a parallax barrier, as long as it includes a pair of substrates bonded together by a sealing material, it is not limited to a liquid crystal display panel, and may also be a display device such as an EL display device, a plasma display device, an SED display device, or the like.

However, as illustrated in FIG. 2, in the liquid crystal display device in a structure of a parallax barrier and a polarizing plate bonded together, a strain can readily occur due to differences in coefficient of thermal shrinkage between the barrier glass of the parallax barrier and the polarizing plate, and this strain tends to be the cause of peeling of the parallax barrier. Therefore, the present invention can be favorably applicable to liquid crystal display devices having a structure in which a parallax barrier is bonded with a polarizing plate.

In addition, in the liquid crystal display device as explained above, the adhesive layer 61 is preferably formed fully on the opposing surfaces of the parallax barrier 20 and the liquid crystal display panel 10. However, as long as the adhesive layer 61 is provided between the area without the light-shielding layer 20a in the parallax barrier 20 and the liquid crystal display panel 10, the adhesive layer 61 may be formed in only a portion of the opposing surface of the parallax barrier 20 and the liquid crystal display panel 10.

In addition, in the explanation above, as an example of the liquid crystal display panel, the case of a transmissive type TFT liquid crystal display panel is explained, however the liquid crystal display panel may also be a reflection type or transflective type, and also may be a liquid crystal display panel not using the TFT, for example, a passive-matrix type liquid crystal panel.

In addition, as an alternative to the barrier glass 21, transparent substrates made by transparent material other than glass, for example, plastic may also be used.

As described above, the display device according to various preferred embodiments of the present invention is configured such that the image generation device includes a pair of substrates bonded together by a sealing material; around the peripheral portion of the parallax barrier, the parallax barrier includes an area without the light-shielding layer; the ultraviolet curing resin intervenes in at least the area without the light-shielding layer in the parallax barrier and the image generation device; and the sealing material is arranged between the pair of substrates in such a manner that at least a portion of the sealing material overlaps the area without the light-shielding layer.

According to this unique structure, by having the parallax barrier include an area without the light-shielding layer being formed on the peripheral portion of the parallax barrier, the peeling on the bonding surfaces of the parallax barrier and the image generation device is prevented, and also by having at least a portion of the sealing material overlapping with the area without the light-shielding layer, it is possible to inhibit the strain of the substrate on the side of the parallax barrier constructing the image generation device. Thereby, preferred embodiments of the present invention have the effect of preventing the peeling on the bonding surfaces of the parallax barrier and the image generation device, and also prevent the occurrence of display non-uniformity caused by the strain in substrates.

The present invention is useful in production of display devices that allow different images to be displayed towards a plurality of display directions, respectively with no defect and high display performance, such as 3D display devices and multiple image display device.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A display device comprising:
    an image generation device arranged to generate display images; and
    a parallax barrier including a light-shielding layer disposed on a transparent substrate, the image generating device and the parallax barrier being bonded with an ultraviolet curing resin; wherein
    the image generation device includes a pair of substrates bonded together by a sealing material;
    around a peripheral portion of the parallax barrier, the parallax barrier includes an area without the light-shielding layer;
    the ultraviolet curing resin intervenes in at least the area without the light-shielding layer in the parallax barrier and the image generation device; and
    the sealing material is arranged between the pair of substrates such that at least a portion of the sealing material overlaps the area without the light-shielding layer.

2. A display device according to claim 1, wherein the sealing material is arranged without overlapping with the light-shielding layer of the parallax barrier.

3. A display device according to claim 1, wherein the sealing material is arranged such that a distance between an image of the sealing material projected on the surface of the transparent substrate and the light-shielding layer is about 2 mm or shorter.

4. A display device according to claim 1, wherein the whole of the sealing material overlaps with the parallax barrier.

5. A display device according to claim 4, wherein the parallax barrier completely overlaps with the image generation device.

6. A display device according to claim 1, wherein the parallax barrier overlaps completely with the image generation device.

7. A display device according to claim 1, wherein the image generation device is a liquid crystal display device including a liquid crystal layer sandwiched between the pair of substrates, and the sealing material surrounds the liquid crystal layer.

8. A display device according to claim 7, wherein the liquid crystal display device further comprises a polarizing plate bonded to the parallax barrier by the ultraviolet curing resin.

9. A display device according to claim 1, wherein the image generation device comprises a plurality of pixel columns to display different images towards a plurality of different viewpoints.

10. A display device according to claim 9, wherein the plurality of pixel columns of the image generation device allows display of different images towards a plurality of different viewers.

11. A display device according to claim 2, wherein the sealing material is arranged such that a distance between an image of the sealing material projected on the surface of the transparent substrate and the light-shielding layer is about 2 mm or shorter.

12. A display device according to claim 2, wherein the whole of the sealing material overlaps with the parallax barrier.

* * * * *